INVENTOR:
BOBBY JOE SANDERS

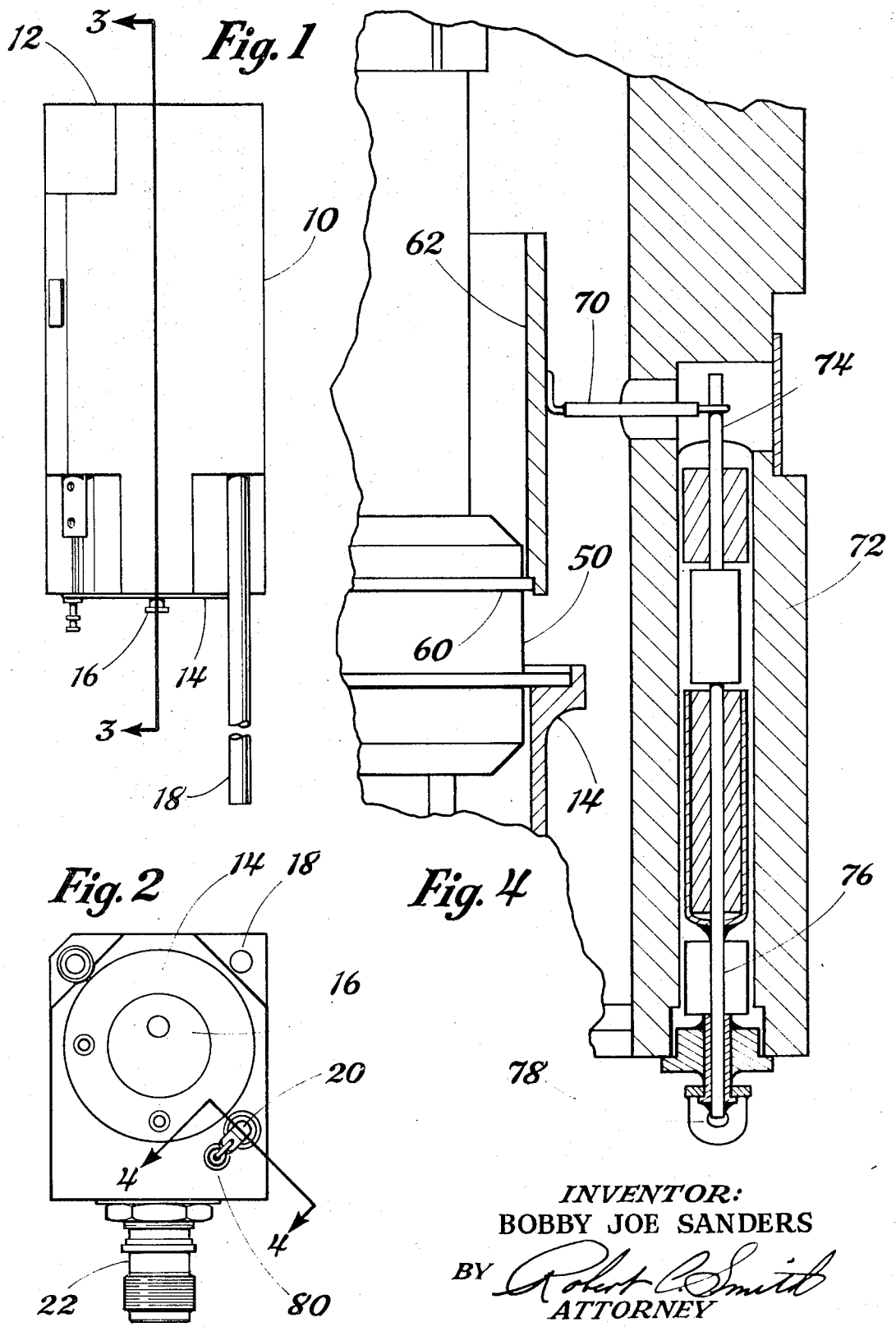

BY Robert Smith
ATTORNEY

United States Patent Office 3,544,917
Patented Dec. 1, 1970

3,544,917
MICROWAVE CAVITY
Bobby J. Sanders, Pacoima, Calif., assignor to The
Bendix Corporation, a corporation of Delaware
Filed Aug. 28, 1968, Ser. No. 756,042
Int. Cl. H03b 5/18
U.S. Cl. 331—98                                    10 Claims

ABSTRACT OF THE DISCLOSURE

A microwave cavity for use with a high frequency planar triode is disclosed wherein certain of its physical characteristics and dimensions provide nearly optimum performance in either the transmitting or receiving modes of operation in a radar system without significant frequency shift. This cavity includes a cylindrical anode member or extension which is attached to the anode pin of the tube and a grid cylinder coaxially positioned with respect to the anode member. A cathode cylinder is included which closes one end of the cavity housing and which has a length of one quarter wave length measured to the cathode flange of the tube. A radio frequency probe is located adjacent the cathode flange. Two of the characteristics which have proven to be most significant in affecting operation of the cavity are the anode inductance and the anode-to-grid capacity. Dimensions of the grid cylinder and the anode extension have been determined to control these characteristics such that the ratio of the diameters of the grid cylinder to the anode member is approximately 1.77 and such that the length of the grid cylinder is approximately one and one-seventh times one quarter wave length.

BACKGROUND OF THE INVENTION

Microwave cavities have long been used as essential components of radar systems. The cavity consists of a vacuum tube designed to operate at the desired microwave frequencies physically positioned within a mechanical structure whose dimensions are carefully chosen to provide the desired inductance and capacitance effects, the entire assembly serving as a re-entrant type oscillator. Conventional design practice calls for separate cavities for each of the transmitting and receiving functions of the system. This is because the physical characteristics, including dimensions, which make the cavity optimum as a power transmitter are not the same as those which favor receiver sensitivity and also for the obvious reason that a cavity cannot be operating in receiving and transmitting modes at the same time.

The microwave cavity, however, is one of the most expensive components in the entire radar system, and attempts have been made to design systems in which a single cavity can serve both functions. The success of this approach depends, to a considerable extent, upon performance requirements. If the ranges expected are substantial, the limitation as to timing of transmitting and receiving modes, which places a lower limit on the range which the system can sense, may not be significant. A more serious problem which has been encountered is that of frequency shift in the transition from receiving mode to transmitting mode. If the cavity is designed for maximum receiver sensitivity, its resonant frequency will be significantly higher in the receiving mode than when operating as a transmitter. If designed to transmit maximum power, the resonant frequency as a transmitter is higher than the receiving resonant frequency. Since the receiver must operate on the transmitted frequency, a design with a single cavity for both modes has always involved compromises with substantial performance degradation in either the transmitting or the receiving mode, or in terms of overall performance or loop gain, as compared with a system having two cavities, each optimized for its particular function.

SUMMARY OF THE INVENTION

The microwave cavity disclosed herein is basically a full wavelength coaxial cavity resonating structure using quarter wavelength, or approximately quarter wavelength, tuning elements to obtain proper operation. A high mu, high transconductance planar triode is used as its active element. In attempting to determine the configuration which would lead to good performance in both the transmitting and receiving modes, the anode line-grid cylinder combination was examined, since these components define two tuned circuits which primarily set the frequency at which the cavity will be most responsive. Since the cathode line is a feedback control, it inherently has a different effect on transmitter frequency from its effect on receiver frequency. Since, as described above, optimizing the cavity as either a receiver or a transmitter will result in degraded performance and frequency shift when operating in the opposite mode, an adjustment of cathode line behavior vs. grid tank behavior must be made in order to get the transmitting frequency to be within a range approaching the frequency of maximum receiver sensitivity.

Because of a need to obtain satisfactory receiver sensitivity, the cathode line which includes the support that connects the housing to the cathode electrode of the tube and the adjacent portion of the outer cavity cylinder were designed to provide substantial feedback voltage to maintain oscillation. This resulted in a length of the cathode cylinder or support member being approximately one quarter wavelength at the desired frequency.

With the cathode component dimensions established, it became necessary to adjust the anode inductance and the anode to grid capacity to achieve proper operational and frequency characteristics. The most favorable results were obtained by lengthening the grid cylinder somewhat from that which would provide optimum transmitter performance and by decreasing the diameter of the anode line to decrease the anode inductance and the anode to grid capacity. These changes tend to adjust the cavity's rise rate and power level in such manner as to apply similar stresses to the internal elements of the tube during both modes of operation so that the dynamic characteristics of the tube are not greatly disturbed during transitions from receiving to transmititng mode and vice versa. The rate of change of the transmitter resonant frequency was affected more by varying the capacitive region between the grid cylinder and the anode line, but the rate of change of the point of maximum receiver sensitivity was affected more by varying the grid cylinder length. Thus the capacitive region dimensions were adjusted to achieve the desired transmitter resonant frequency by adjusting the ratio of the grid cylinder diameter to the diameter of the anode line or anode contact member wherein an optimum value was found to be approximately 1.77 with substantial degradation being noticeable if the ratio varied by more than about 5% in either direction. Grid cylinder length was adjusted to bring the frequency of maximum receiver sensitivity to the established transmitter frequency. The optimum value for this dimension is about one and one-seventh times one quarter wavelength, again within about 5%.

Thus, applicant has provided a microwave cavity which provides very good performance in both receiving and transmitting modes with little or no frequency shift experienced when changing modes. Although established transmitter cavity designs would not have indicated such structure, a quarter wavelength internal cathode line was used to achieve satisfactory feedback for receiver sensitivity. To achieve good output power for the transmitting mode, the radio frequency output probe was placed adjacent the cathode contact (about one quarter wavelength from the cathode short at the end of the housing) which provides maximum available radio frequency power to the antenna rather than at the point of a power null where the greatest receiver sensitivity would be expected. As stated above, the cavity cannot operate in both receiving and transmitting modes simultaneously, and some limited time is required for effecting the transaction from one mode to the other. This provides a lower limit on the effective range which can be measured with a single cavity radar system. For example, in a known system using 4300 mHz., a dual cavity system can be expected to provide reliable measurements within ten feet, whereas a single cavity system would be able to provide reliable readings to a minimum range of about 150 feet. Receiver sensitivity and transmitter power, however, have proven to be only slightly below that of a two-cavity system, with transmitter power being about 2 dbm. below that of a typical optimum transmitter cavity and receiver sensitivity about 1½ to 2 db. less than an optimum receiver cavity. Thus, a single cavity radar system using applicant's cavity compares very favorably in performance with a two-cavity system for all applications except those requiring the measurement of extreme short ranges.

DESCRIPTION OF THE DRAWINGS

FIG. 1 is a plan view showing one side of a microwave cavity utilizing my invention.

FIG. 2 is a plan view of one end of the device shown in FIG. 1.

FIG. 4 is a partial sectional view taken along line 4—4 of FIG. 2.

DESCRIPTION OF THE PREFERRED EMBODIMENT

Figure 3:
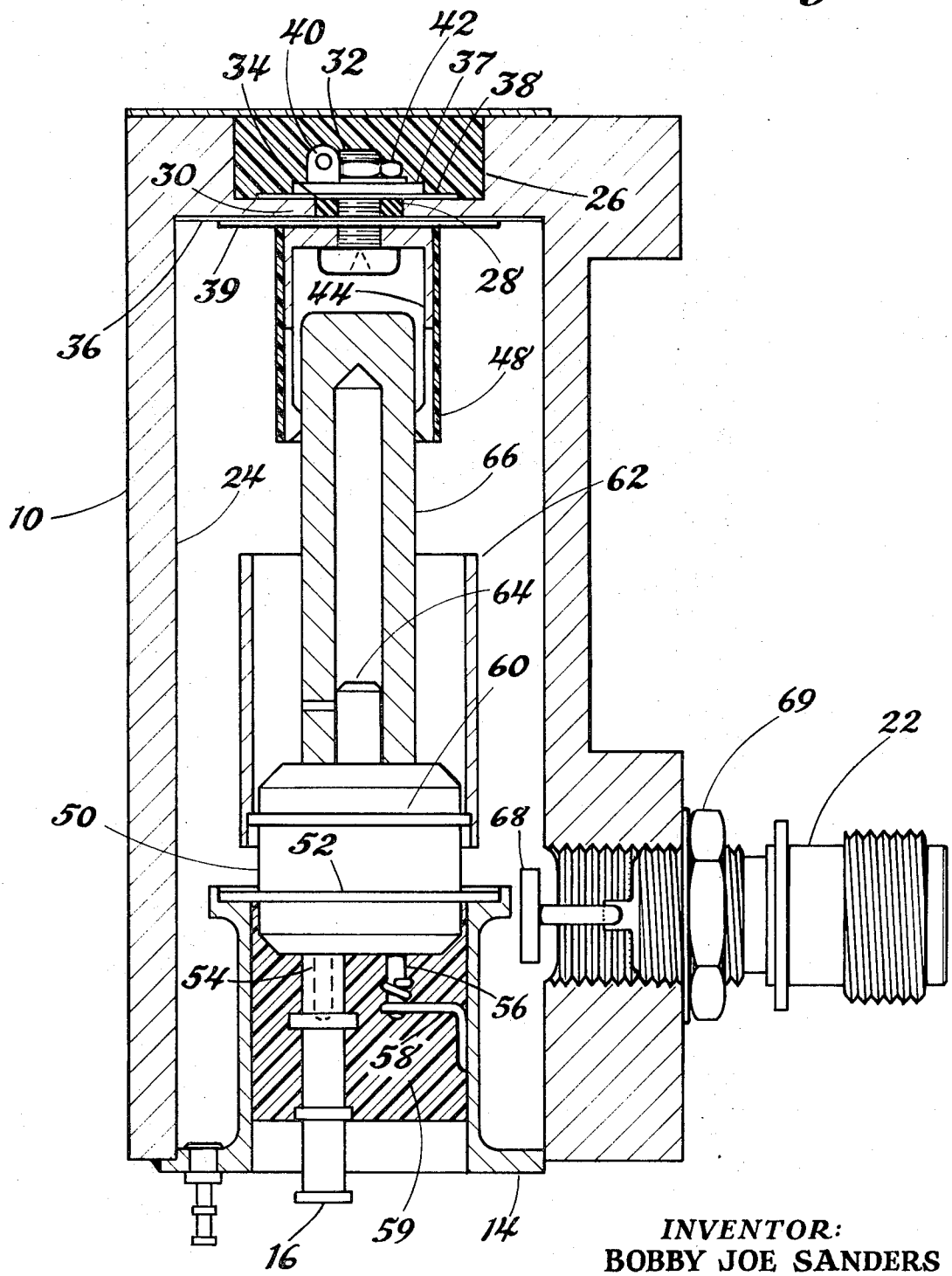
FIG. 3 is a sectional view taken along line 3—3 of FIG. 1.

FIG. 1 shows a plan view of one side of a microwave cavity including a housing 10 having a cover member 12 at one end and a cathode cylinder or cathode support member 14 at its opposite end. An electrical terminal pin 16 and a conductor 18 are also shown connected to housing 10. FIG. 2 is a plan view of one end of the device of FIG. 1 and also shows housing 10, cathode cylinder 14, electrical terminal pin 16 and conductor 18. This view also shows an additional conductor 20 through which power is supplied to the grid of the microwave tube as hereinafter discussed and a threaded electrical connector 22.

FIG. 3 shows a sectional view of the device of FIG. 1 taken along line 3—3 of FIG. 1. In this view, the housing 10 is shown as having an essentially cylindrical internal chamber 24 which is closed at one end by means of an end cap member or cathode cylinder 14. At the opposite end of housing 10 is a shallow cylindrical bore 26. A hole 28 is drilled through an end wall 30 at the base of bore 26 and through this hole passes a screw 32 held centered in hole 28 by an insulating bushing 34. On opposite sides of end wall 30 are placed washers 36 and 38 of insulating material and washers 37 and 39 of conducting material which overlay washers 36 and 38, respectively.

Screw 32 fastens a terminal lug 40 and a cylindrical electrical contact member 44 against conducting washers 37 and 39. Conductor 18 is connected to lug 40 to supply high voltage from an external source to member 44. A layer of insulating sleeving 48 is fastened to the outside surface of the electrical contact member 44.

Supported at the inner end of the cathode cylinder 14 is a high mu, high transconductance planar triode 50 which has a radially extending cathode contact member 52. The electrical terminal pin 16 is shown connected to a pin 54 shown in dotted outline and extending from tube 50. Similarly, a pin 56 also extends from tube 50 and is mechanically and electrically connected to the internal wall of cathode cylinder 14 by means of a wire 58.

The cathode cylinder 14 is firmly bonded to the tube 50 by means of epoxy casting resin 59 which substantially fills the interior of cylinder 14 and encloses members 56, 58 and most of pin 16.

Also extending radially beyond the cylindrical side wall of tube 50 is a grid contact member 60 which is held in contact with a grid cylinder member 62. An anode contact pin 64 extends from the righthand end of tube 50 and carries one end of an anode member 66 which, it will be appreciated, electrically becomes an extension of anode pin 64. Member 66 is also supported mechanically by contact member 44.

Within the electrical connector 22 which is fastened to the side wall of housing 10 is a coaxial lead connected to a radio frequency probe 68 which is threadedly engaged with the side wall of housing 10 in such manner that the probe 68 may be adjusted by means of a nut 69 to control the depth of penetration of probe 68 into the cavity to control the feedback level of the cavity. As set forth above, the height of the cathode cylinder is approximately one quarter wavelength, and the probe 68 is positioned to withdraw power from the cavity at a point adjacent to cathode contact member 52 which is effectively one quarter wavelength from the cathode short which is the point of contact of the cathode cylinder with the end of housing member 10.

Referring now to FIG. 4, which is a partial sectional view taken along line 4—4 of FIG. 2, this view shows the triode tube 50, the cathode cylinder 14, the grid contact member 60, and the grid cylinder 62. Mechanically and electrically connected with the grid cylinder 62 is an electrical wire 70 which communicates with a source of electrical voltage (not shown) through a resistor 72 having leads 74 and 76 with lead 76 terminating in a solder lug 78. In addition to providing a means for connecting grid cylinder 62 with an external voltage source, lug 78 has a connection shown in FIG. 2 with a conventional grid termination line 80 whose principal function, as is well known in the art, is in providing an impedance match with the incoming source.

As set forth in the above summary, applicant found that two of the dimensions in the cavity which became quite critical were those which affected the anode inductance and the anode to grid capacity. The dimensions sepcifically involved are the diameter of the anode member 66 and the length of the grid cylinder 62. The anode to grid capacity is affected by varying the ratio of the diameter of the anode member 66 to the grid cylinder 62 which is conveniently affected by varying the diameter of the member 66. Similarly, the length of grid cylinder 62 has been established at approximately 1¼ times one quarter wavelength, rather than one quarter wavelength which would have been expected to provide optimum transmitter performance.

While only one embodiment has been shown and described herein, modifications may be made within the scope of the present invention, and I do not wish to be limited other than by the language of the following claims.

I claim:

1. A microwave cavity device including an electron tube of generally cylindrical configuration with a radially extending cathode contact member, a radially extending grid contact member and an axially extending anode pin;

a housing having a generally cylindrical space within said housing for containing said electron tube, and including a generally cylindrical end cap member in contact with said cathode contact member, an end wall at its opposite end with a generally cylindrical anode contact member fastened thereto, and means connecting said anode contact member with a high voltage source;

a cylindrical anode member in contact with said anode pin and said anode contact member;

a grid cylinder in contact with said radially extending grid contact member coaxially spaced with respect to said anode member, and means connecting said grid cylinder with a source of electrical voltage;

characterized in that a radio frequency probe extends through the side wall of said housing into said space in close proximity to said cathode contact member, said end cap member has an axial dimension such that the distance between its point of contact with said housing and said cathode contact member is approximately one quarter wavelength, and said grid cylinder is axially displaced from said cathode contact member such that the distance from said grid cylinder to said radio frequency probe is much greater than the distance from said cathode contact member to said radio frequency probe.

2. A microwave cavity device as set forth in claim 1 wherein said radio frequency probe is adjustable to vary the distance between itself and said cathode contact member.

3. A microwave cavity device as set forth in claim 1 wherein the length of said grid cylinder substantially exceeds one quarter wavelength.

4. A microwave cavity device as set forth in claim 3 wherein the length of said grid cylinder is approximately 1½ times one quarter wavelength.

5. A microwave cavity device as set forth in claim 4 wherein said grid cylinder diameter is approximately 1.77 times the diameter of the anode member and the grid cylinder length is approximately 1½ times one quarter wavelength.

6. For use with a high frequency planar triode tube having a generally cylindrical configuration and including a radially extending cathode contact member, a radially extending grid contact member, and an axially extending anode pin;

a microwave cavity structure including a housing having a cylindrical internal chamber with an end wall at one end, a generally cylindrical end cap member in contact with the opposite end of said housing and with said radially extending cathode contact member, said end cap member having an axial dimension of approximately one quarter wavelength at the design frequency;

an anode contact member attached to said end wall and means connecting a high voltage source thereto;

a cylindrical anode member supported between said anode pin and said anode contact member;

a grid cylinder in contact with said radially extending grid contact member and coaxially spaced with respect to said anode member, and means connecting said grid cylinder with a voltage source; and a radio frequency probe extending into said chamber in close proximity to said cathode contact member.

7. A microwave cavity device as set forth in claim 6 wherein said radio frequency probe is adjustable to vary the distance between itself and said cathode contact member.

8. A microwave cavity device as set forth in claim 6 wherein the length of said grid cylinder substantially exceeds one quarter wavelength.

9. A microwave cavity device as set forth in claim 8 wherein the length of said grid cylinder is approximately 1½ times one quarter wavelength.

10. A microwave cavity device as set forth in claim 9 wherein said grid cylinder diameter is approximately 1.77 times the diameter of the anode member and the grid cylinder length is approximately 1½ times one quarter wavelength.

No references cited.

JOHN KOMINSKI, Primary Examiner

U.S. Cl. X.R.

313—249; 315—39